(12) United States Patent  (10) Patent No.: US 9,395,881 B2
McConnell et al.  (45) Date of Patent: Jul. 19, 2016

(54) METHODS AND SYSTEMS FOR NAVIGATING DISPLAY SEQUENCE MAPS

(75) Inventors: Jager McConnell, San Francisco, CA (US); Ciara Peter, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 614 days.

(21) Appl. No.: 13/547,911

(22) Filed: Jul. 12, 2012

(65) Prior Publication Data
US 2013/0019161 A1  Jan. 17, 2013

Related U.S. Application Data (60) Provisional application No. 61/507,023, filed on Jul. 12, 2011.

(51) Int. Cl.
G06F 3/00 (2006.01)
G06F 3/048 (2013.01)
G06F 3/0482 (2013.01)

(52) U.S. Cl.
CPC .................................. G06F 3/0482 (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff et al. | |
| 6,216,135 B1 | 4/2001 | Brodersen et al. | |

(Continued)

OTHER PUBLICATIONS

Saba, "Saba Announces Revolutionary Social Enterprise Platform," Press Release, Mar. 20, 2012, pp. 1-4, Redwood Shores, California.

*Primary Examiner* — Stella E Higgs
(74) *Attorney, Agent, or Firm* — Dergosits & Noah LLP; Todd A. Noah (57) ABSTRACT

Systems and methods are provided for navigating display sequence maps. A system outputs, to a display device, content views in response to receiving requests for content views via a user interface. At least one of the content views may include a link that enables navigation to another one of the content views. Each of the content views may be a revision to content of another one of the content views. The system outputs, to the display device, a hierarchical representation of a sequence in which the content views were displayed in response to receiving a request for the hierarchical representation via the user interface. The hierarchical representation includes visual representations corresponding to the content views. The system outputs, to the display device, a selected one of the content views in response to a selection of the one of the visual representations corresponding to the content views from the hierarchical representation.

20 Claims, 5 Drawing Sheets

(56) References Cited

U.S. PATENT DOCUMENTS

| | | |
|---|---|---|
| 6,233,617 B1 | 5/2001 | Rothwein et al. |
| 6,236,978 B1 | 5/2001 | Tuzhilin et al. |
| 6,266,669 B1 | 7/2001 | Brodersen et al. |
| 6,288,717 B1 | 9/2001 | Dunkle et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,340,411 B2 | 3/2008 | Cook |
| 7,373,599 B2 | 5/2008 | McElfresh et al. |
| 7,401,094 B1 | 7/2008 | Kesler |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,945,653 B2 | 5/2011 | Zuckerberg et al. |
| 8,005,896 B2 | 8/2011 | Cheah et al. |
| 8,010,663 B2 | 8/2011 | Firminger et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,103,611 B2 | 1/2012 | Tuzhilin et al. |
| 8,150,913 B2 | 4/2012 | Cheah et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0028553 A1* | 2/2003 | Kondo ........................ 707/200 |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0003351 A1* | 1/2004 | Sommerer et al. ............ 715/517 |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0260996 A1* | 11/2007 | Jakobson ..................... 715/781 |
| 2009/0063415 A1 | 3/2009 | Chatfield et al. |
| 2009/0204900 A1* | 8/2009 | Champion et al. ............ 715/738 |
| 2009/0276471 A1* | 11/2009 | Baer ................ G06F 17/30011 |
| 2009/0293018 A1* | 11/2009 | Wilson et al. .................. 715/811 |
| 2011/0099508 A1* | 4/2011 | Liu ............................... 715/781 |
| 2011/0126094 A1* | 5/2011 | Horodezky et al. ........... 715/702 |
| 2012/0272153 A1* | 10/2012 | Grossman et al. ............ 715/720 |

\* cited by examiner

METHODS AND SYSTEMS FOR NAVIGATING DISPLAY SEQUENCE MAPS

CLAIM OF PRIORITY

This application claims the benefit of U.S. Provisional Patent Application 61/507,023 entitled You.Com, by McConnell, et al., filed Jul. 12, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

NAVIGATING DISPLAY SEQUENCE MAPS

One or more implementations relate generally to navigating display sequence maps.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

An application program, also known as an application or an app, is computer software designed to help a computer user to perform specific tasks. Examples of application programs include enterprise software, accounting software, office suites, graphics software and media players. Many application programs deal principally with documents. Application programs may be bundled with a computer and its system software, or may be published separately. Some computer users are satisfied with the bundled application programs and need never install a separate application program.

A widget is an element of a graphical user interface (GUI) that displays an information arrangement changeable by a computer user, such as a window or a text box. The defining characteristic of a widget is to provide a single interaction point for the direct manipulation of a given kind of data. Widgets are basic visual building blocks which, combined with an application program, hold all the data processed by the application program and the available interactions on this data. Some computer users may view data from countless application programs and/or widgets in a single session. Accordingly, it is desirable to provide techniques that enable a database system supporting application programs and/or widgets to improve the performance, efficiency, and the ease of use of the application programs and/or widgets.

BRIEF SUMMARY

In accordance with embodiments, there are provided systems and methods for navigating display sequence maps. The systems and methods output, to a display device, content views in response to receiving requests for content views via a user interface. At least one of the content views may include a link that enables navigation to another one of the content views. For example, a mobile phone displays widgets from which a mobile phone user can select to view records associated with the widgets. Each of the content views may be a revision to content of other content views. For example, a laptop computer displays a document that a laptop computer user has repeatedly revised based on previous versions of the document. The system outputs, to the display device, a hierarchical representation of a sequence in which the content views were displayed in response to receiving a request for the hierarchical representation via the user interface, with the hierarchical representation including visual representations corresponding to the content views. For example, the mobile phone displays a map of icons that represent the widgets and widgets' records and the sequence in which the widgets and widgets' records were displayed to the mobile phone user. In another example, the laptop computer displays a map of icons that represents the document revisions and the sequence of document revisions entered by the laptop user. The system outputs, to the display device, a selected content view in response to a selection of a visual representation corresponding a content view from the hierarchical representation via the user interface. For example, the mobile phone displays a previously viewed widget record in response to the mobile phone user selecting the icon for the previously viewed widget record from the map of display icons. In another example, the laptop computer displays a previous revision to the document in response to the laptop computer user selecting the icon for the previous revision from the map of display icons. The system enables system users to quickly identify and review previously displayed content using a map of icons, instead of having to remember how to navigate to specific previously displayed content and taking the time to navigate through numerous content views to review the specific previously displayed content.

While one or more implementations and techniques are described with reference to an embodiment in which navigating display sequence maps is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for navigating display sequence maps.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for navigating display sequence maps will be described with reference to example embodiments.

The following detailed description will first describe a method for quickly identifying and reviewing previously displayed content from a map of icons corresponding to the previously displayed content.

Next, screen shots illustrating frames of example user interface screens are described.

Figure 1:
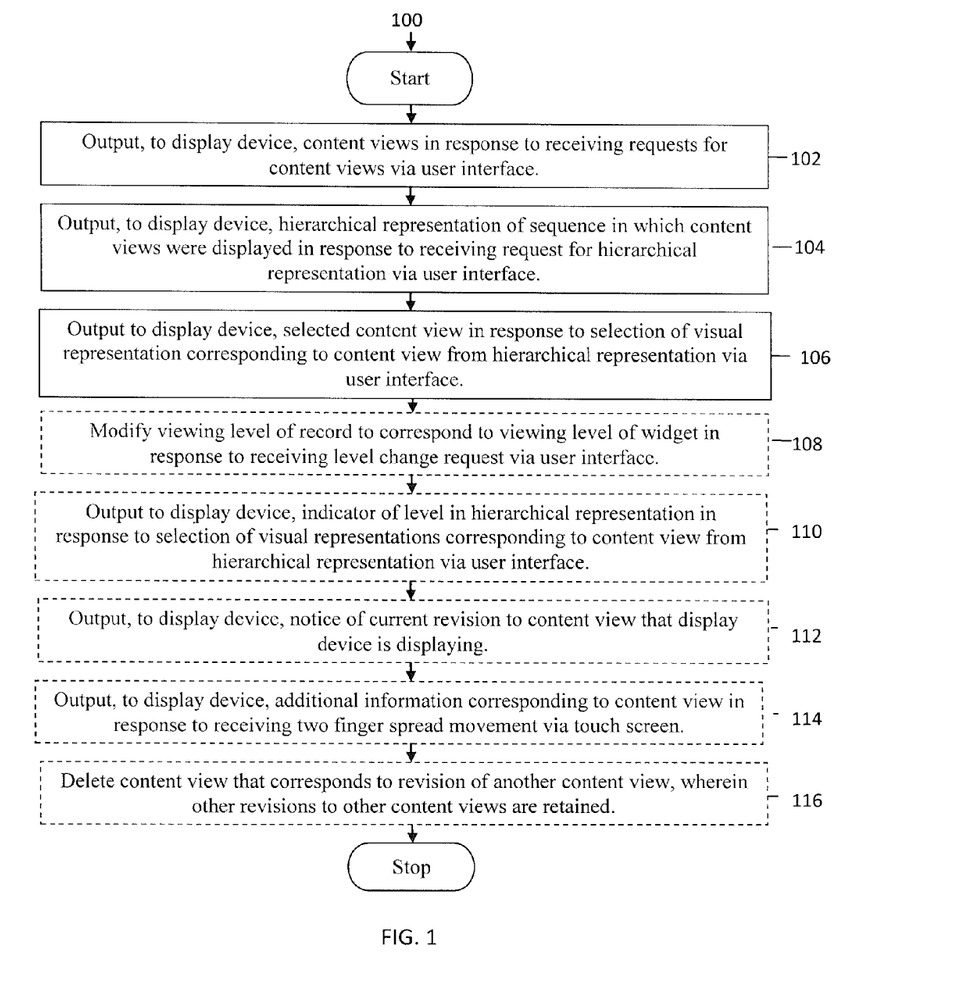
FIG. 1 is an operational flow diagram illustrating a high level overview of a method for navigating display sequence maps in an embodiment.

FIG. 1 is an operational flow diagram illustrating a high level overview of a method 100 for navigating display sequence maps in an embodiment. As shown in FIG. 1, a database system can enable a system user to view a map of icons representing previously displayed content and the sequence in which the previously displayed content was displayed, and select some of the previously displayed content for review.

In block 102, content views are output to a display device in response to receiving requests for content views via a user interface. At least one of the content views may include a link that enables navigation to another one of the content views. For example and without limitation, a mobile phone displays widgets from which a mobile phone user can select to view records associated with the widgets. Each of the content views may be a revision to content of other content views, and each of the content views may be an electronic document. For example, a laptop computer displays a document that a laptop computer user has repeatedly revised based on previous versions of the document. The display device may also be any type of handheld computing device, the content views may also be webpages, and the user interface may be a touch screen or a mouse wheel.

In block 104, a hierarchical representation of sequence in which content views were displayed is output to a display device in response to receiving a request for the hierarchical representation via a user interface. By way of example and without limitation, this can include the mobile phone displaying a map of icons that represent the widgets and widgets' records and the sequence in which the widgets and widgets' records were displayed to the mobile phone user. In another example, the laptop computer displays a map of document revision icons that represents the revisions and the sequence of revisions entered by the laptop user. The hierarchical representation may include visual representations corresponding to the content views, and each of the visual representations corresponding to the content views in the hierarchical representation may include a corresponding identifier. Examples of maps of icons are described below in reference to FIG. 2 and FIG. 3. The database system may receive the request for the hierarchical representation through a two finger pinch movement via a touch screen.

In block 106, a selected content view is output to a display device in response to a selection of a visual representation corresponding to the content view from a hierarchical representation via a user interface. In embodiments, this can include the mobile phone displaying a previously viewed widget record in response to the mobile phone user selecting an icon for the previously viewed widget record from the map of display icons. In another example, the laptop computer displays a previous revision to the document in response to the laptop computer user selecting the icon for the previous revision from the map of display icons. The database system enables system users to quickly identify and review previously displayed content using a map of icons, instead of having to remember how to navigate to specific previously displayed content and taking the time to navigate through numerous content views to review the specific previously displayed content.

In block 108, a viewing level of a record is modified to correspond to a viewing level of a widget in response to receiving a level change request via a user interface. For example and without limitation, this can include the database system modifying a viewing level of a record containing contact information to correspond to the viewing level of widgets because the user needs the contact information so often that the user wants to access the contact information from the highest access level that displays widgets. Thereafter, the user does not have to select a widget to request the contact information because the user can simply scroll through the upper level of widgets to directly access the contact information.

In block 110, an indicator of a level in a hierarchical representation is output to a display device in response to a selection of a visual representation corresponding to a content view from the hierarchical representation via a user interface. In embodiments, this can include the database system outputting a set of four matching symbols, with the fourth symbol highlighted, to indicate to a system user that the level of the currently selected content view is three levels below the highest level of content views. This enables system users to have a general idea of where the current content view is relative to other content views in the map of content views without having to request to view the map of content views.

In block 112, a notice of a current revision to a content view that a display device is displaying is output to the display device. For example and without limitation, this can include the database system outputting a notice of a current revision to a document that the display device is currently displaying. This enables users to be aware of revisions to documents while the documents are being reviewed.

In block 114, additional information corresponding to a content view is output to a display device in response to receiving a two finger spread movement via a touch screen. By way of example and without limitation, this can include the database system outputting contact information in response to receiving a two finger spread movement for a list of contacts via a touch screen.

In block 116, a content view that corresponds to a revision of another content view is deleted, wherein other revisions to other content views are retained. In embodiments, this can include the database system deleting a previous revision to a document while retaining revisions to the document that were made subsequent to the deleted revision. This enables users to selectively undo some previous revisions without having to reenter all of the revisions that occurred after the deleted revision.

The method 100 may be repeated as desired. Although this disclosure describes the blocks 102-116 executing in a particular order, the blocks 102-116 may be executed in a different order.

Figure 2:
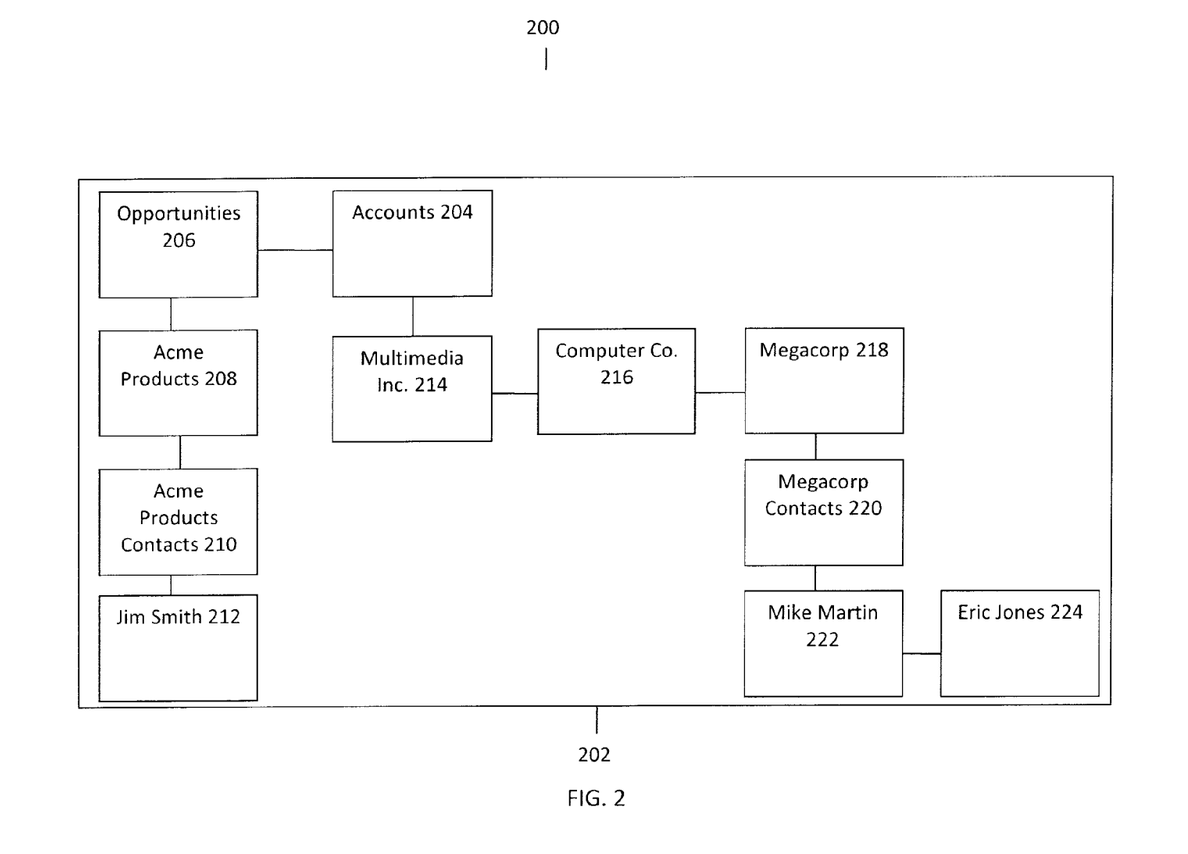
FIG. 2 is a screen shot illustrating a frame of an example user interface screen of a display device supporting methods for managing multiple timelines of network feeds.

FIG. 2 is a screen shot illustrating a frame 200 of an example user interface screen of a display device supporting methods for navigating display sequence maps. The frame 200 may include a hierarchical representation of the sequence in which content views were displayed 202, or map 202, and visual representations corresponding to the content views 204-224, or icons for content views 204-224. The map 202 displays the icons 204-224 for the content views in the sequence in which the content views were initially displayed by a display device. Each of the icons 204-224 for the content views is identified by an identifier that enables a system user to identify the corresponding content views.

For example, the map 202 of the icons 204-224 indicates that a mobile phone user swiped right on the touch screen of her mobile phone, such that the mobile phone no longer displayed the Accounts widget 204, but the Opportunities widget 206 instead. The mobile phone user selected the company Acme Products from the Opportunities widget 206, such that the mobile phone displayed the Acme Products records 208 next. The mobile device user selected the Acme Products Contacts records from the Acme Products records 208, such that the mobile phone displayed the Acme Products Contacts records 210 next. Then the mobile phone user requested the contact information for Jim Smith from the Acme Products Contacts records 210, such that the mobile phone displayed the contact information for Jim Smith 212 next. The mobile phone user may have recorded the telephone number for Jim Smith, and called him to confirm that Acme Products has the products that meet the specifications for a project that she is working on with Megacorp corporation.

At this point, the mobile phone user wanted to ask somebody in Megacorp to contact Jim Smith about purchasing the products for the project that Megacorp is working on with the mobile phone user. The mobile phone user returned to the homepage of her mobile phone, which displayed the Accounts widget 204. The mobile phone user requested the Accounts widget 204 to list the user's accounts, such that the mobile phone displayed the Multimedia Inc. records 214 first. The mobile phone user swiped left on the touch screen of her mobile phone, such that the mobile phone no longer displayed the Multimedia Inc. records 214, but the Computer Co. records 216 instead. The mobile phone user swiped left again on the touch screen of her mobile phone, such that the mobile phone no longer displayed the Computer Co. records 216, but the Megacorp records 218 instead. The mobile device user selected the Megacorp Contacts records from the Megacorp records 218, such that the mobile phone displayed the Megacorp Contacts records 220 next. Then the mobile phone user requested the contact information from the Megacorp Contacts records 220, such that the mobile phone displayed the contact information for Mike Martin 222 next. The mobile phone user swiped left on the touch screen of her mobile phone, such that the mobile phone no longer displayed the contact information for Mike Martin 222, but the contact information for Eric Jones 224 instead. The mobile phone user may have recorded Eric Jones' phone number so that she can call Eric.

The mobile phone user may want to provide Eric with Jim Smith's phone number, which she has recorded, and Jim Smith's email address, which she has not recorded. Rather than having to recall how to navigate to Jim Smith's email address and take the time to navigate through many content views to locate Jim Smith's email address, the mobile phone user applied a two finger pinch movement to her mobile phone's touch screen. The mobile phone responded by displaying the map 202 of the icons 204-224, which includes the icon for the contact information for Jim Smith 212. The mobile phone user applied a two finger spread movement to the icon for the contact information for Jim Smith 212 on her mobile phone's touch screen, such that her mobile phone outputs the contact information for Jim Smith 212.

Figure 3:
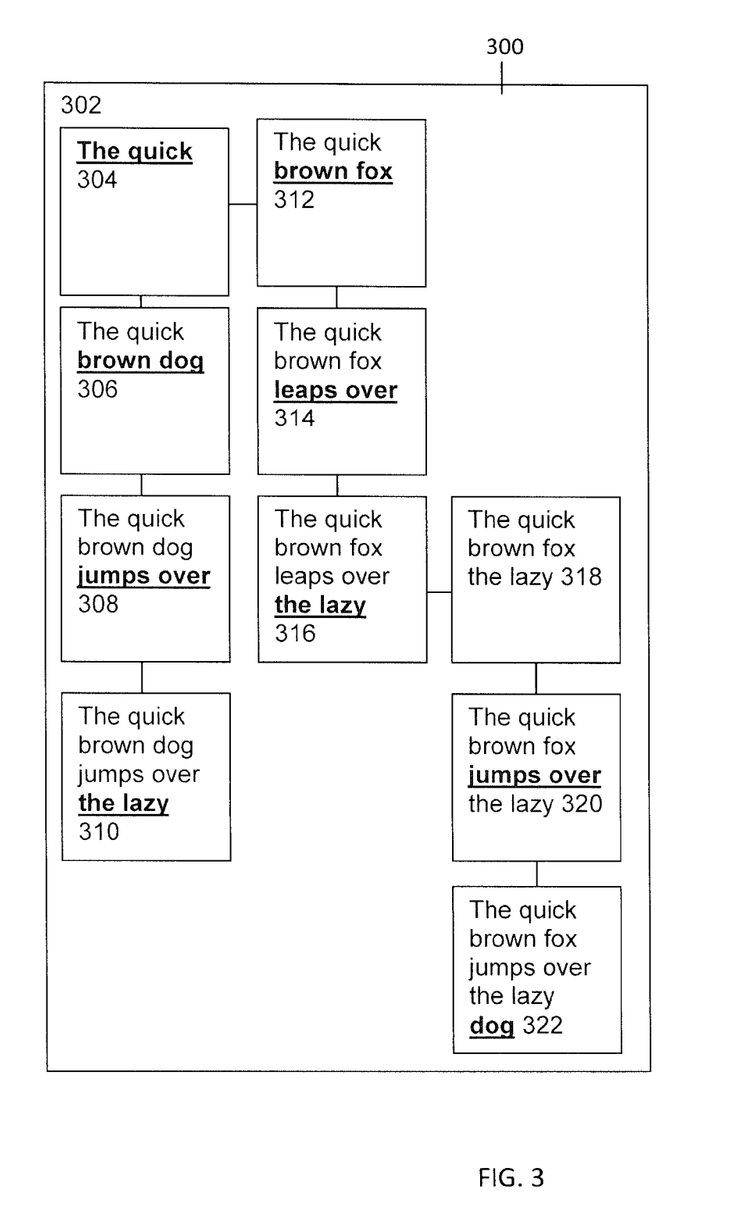
FIG. 3 is another screen shot illustrating another frame of another example user interface screen of a display device supporting methods for managing multiple timelines of network feeds.

FIG. 3 is another screen shot illustrating a frame 300 of another example user interface screen of a display device supporting methods for navigating display sequence maps. The frame 300 may display a hierarchical representation of the sequence in which content views were displayed 302, or map 302, and visual representations corresponding to the content views 304-322, or icons 304-322. The map 302 displays the icons 304-322 that depict the sequence in which content views were displayed by a display device. Each of the icons 304-322 is identified by an identifier that enables a system user to identify the corresponding content views. Although the icons 304-322 display some highlighted words that represent the additions associated with each revision, as well as the previous content associated with the revision, the icons 304-322 may be identified by more or less of the content in the content views to which the icons 304-322 correspond.

In this example, the map 302 of the icons 304-322 indicates that a laptop user created a document 304, and edited the document 304 to create the revisions 306-322 of the document. After the laptop user created the revision 310 of the document, the laptop user realized that the revision 310 of the document included a mistake. Therefore, the laptop user deleted portions of the document and added new parts to the document to create the revision 312 of the document. After creating the revision 312 of the document, the laptop user added additional parts to the document to create the revisions 314 and 316 of the document before discovering another mistake. Rather than having to delete all of the additions that constitute the revisions 314 and 316 of the document, the laptop user applied a two finger pinch movement to her laptop's touch screen. The laptop responded by displaying the map 302 of the icons 304-322, which includes the icons for the content views 314 and 316. The laptop user applies a two finger spread movement to the icon for the content view 314 on her laptop's touch screen, such that her laptop outputs the content view that correspond to the icon 314. The laptop user may delete one of the content views that corresponds to a revision of other content views, wherein other revisions to other content views are retained. For example, by deleting only the additions "leaps over" made in the revision corresponding to the icon 314, the laptop user retains the additions "the lazy" made in the revision corresponding to the icon 316, creating the revision corresponding to the icon 318. This selective deletion of previous revisions enables the laptop user to make the additions "jumps over" to create the revision corresponding to the icon 320 without having to reenter the additions "the lazy: made in the revision corresponding to the icon 316. Therefore, the laptop user can make the final revision corresponding to the icon 322 quicker by selectively deleting only some of the prior revisions, while retaining the desired parts of the prior revisions.

The frames 200-300 may be part of a larger display screen that includes fields for users to enter commands to create, retrieve, edit, and store records. The database system may output a display screen that includes the frames 200-300 in response to a search based on search criteria input via a user interface.

Because the frames 200-300 are samples, the frames 200-300 could vary greatly in appearance. For example, the relative sizes and positioning of the text is not important to the practice of the present disclosure. The frames 200-300 can be depicted by any visual display, but are preferably depicted by a computer screen. The frames 200-300 could also be output as a report and printed or saved in electronic format, such as PDF. The frames 200-300 can be part of a personal computer system and/or a network, and operated from system data received by the network, and/or on the Internet. The frames 200-300 may be navigable by a user. Typically, a system user can employ a touch screen input or a mouse input device to point-and-click to a location on the frames 200-300 to manage the text on the frame 200-300, such as a selection that enables a user to edit the text. Alternately, a system user can employ directional indicators, or other input devices such as a keyboard. The text depicted by the frames 200-300 are examples, as the frames 200-300 may include a much greater amount of text. The frames 200-300 may also include fields in which a user can input textual information.

System Overview

Figure 4:
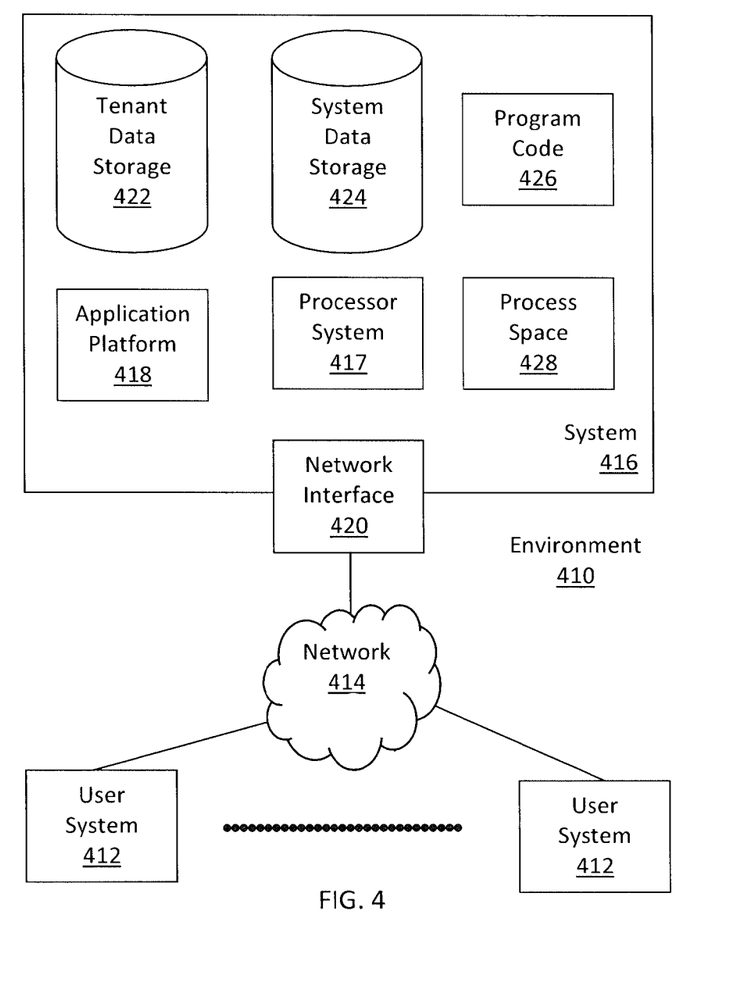
FIG. 4 illustrates a block diagram of an example of an environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content.

With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
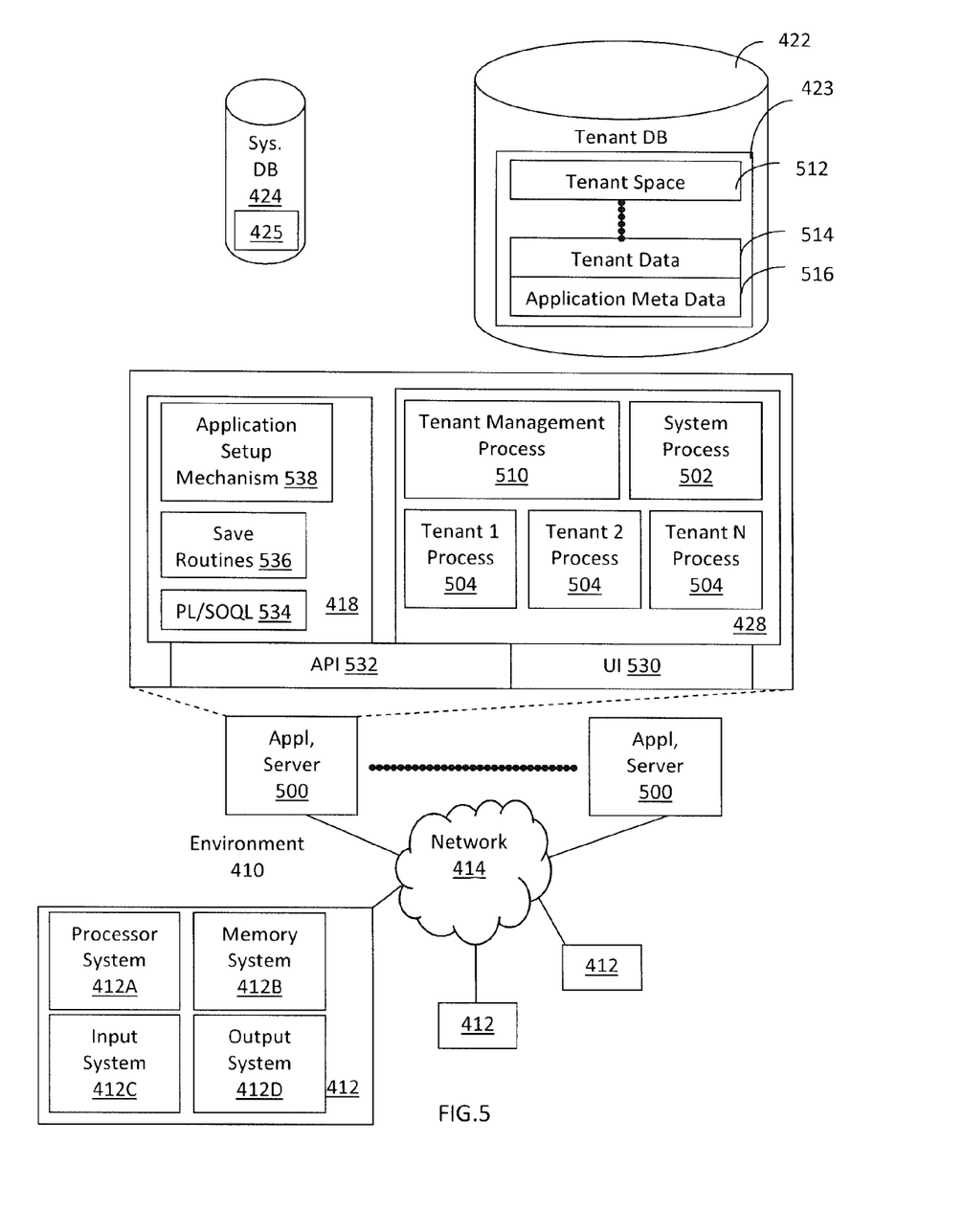
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 34 that provides a programming language style interface extension to API 532. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for navigating display sequence maps, the apparatus comprising:
  a hardware processor; and
  one or more stored sequences of instructions which, when executed by the processor, cause the processor to carry out the steps of:
    outputting, to a display device, a plurality of content views in response to receiving a plurality of requests for content views via a user interface, each of the plurality of content views includes revisions viewable as selectable text in an electronic document or webpage, wherein at least one of the plurality of content views comprises a link that enables navigation to another one of the plurality of content views;
    outputting, to the display device in response to a request via the user interface, a hierarchical representation of a sequence of the plurality of content views, the hierarchical representation comprising a plurality of visual representations corresponding to the plurality of content views, the sequence including at least a first revised content view at a first level of the hierarchical representation and a second revised content view at a second level of the hierarchical representation, the second revised content view including revisions from the first revised content view and new revisions;
    outputting, to the display device, the first revised content view in response to a selection from the hierarchical representation via the user interface of one of the plurality of visual representations corresponding to the first revised content view, and
    deleting the first revised content view such the revisions from the first revised content are deleted while the new revisions in the second revised content view are retained to create a final revised content view in the hierarchical representation, which is then outputted to the display device.

2. The apparatus of claim 1, wherein the display device comprises one of a handheld computing device, a mobile phone, and a laptop computer.

3. The apparatus of claim 1, wherein the plurality of content views comprises a plurality of webpages.

4. The apparatus of claim 1, wherein the plurality of content views comprises a plurality of widgets.

5. The apparatus of claim 4, wherein the plurality of content views comprises a plurality of records associated with the plurality of widgets.

6. The apparatus of claim 1, wherein the user interface comprises a touch screen.

7. The apparatus of claim 1, wherein each of the visual representations corresponding to the plurality of content views in the hierarchical representation comprises a corresponding identifier.

8. The apparatus of claim 1, further comprising modifying a viewing level of a record to correspond to a viewing level of a widget in response to receiving a level change request via the user interface.

9. The apparatus of claim 1, further comprising outputting, to the display device, an indicator of a level in the hierarchical representation in response to the selection of the one of the visual representations corresponding to the plurality of content views from the hierarchical representation via the user interface.

10. The apparatus of claim 1, further comprising outputting, to the display device, a notice of a current revision to one of the plurality of content views that the display device is displaying.

11. A computer program product, comprising a non-transitory computer-readable medium having computer-readable program code embodied therein to be executed by one or more processors, the program code including instructions to:
  output, to a display device, a plurality of content views in response to receiving a plurality of requests for content views via a user interface, each of the plurality of content views includes revisions viewable as selectable text in an electronic document or webpage, wherein at least one of the plurality of content views comprises a link that enables navigation to another one of the plurality of content views;

output, to the display device in response to a request via the user interface, a hierarchical representation of a sequence of the plurality of content views, the hierarchical representation comprising a plurality of visual representations corresponding to the plurality of content views, the sequence including at least a first revised content view at a first level of the hierarchical representation and a second revised content view at a second level of the hierarchical representation, the second revised content view including revisions from the first revised content view and new revisions;

outputting, to the display device, the first revised content view in response to a selection from the hierarchical representation via the user interface of one of the plurality of visual representations corresponding to the first revised content view; and delete the first revised content view such the revisions from the first revised content are deleted while the new revisions in the second revised content view are retained to create a final revised content view in the hierarchical representation, which is then outputted to the display device.

12. The computer program product of claim 11, wherein the request for the hierarchical representation is received through a two finger pinch movement via a touch screen.

13. The computer program product of claim 11, further comprising instructions to output, to the display device, an indicator of a level in the hierarchical representation in response to the selection from the hierarchical representation via the user interface of one of the visual representations corresponding to the first revised content view.

14. A method for navigating display sequence maps, the method comprising:

outputting, to a display device, a plurality of content views in response to receiving a plurality of requests for content views via a user interface, each of the plurality of content views includes revisions viewable as selectable text in an electronic document or webpage, wherein at least one of the plurality of content views comprises a link that enables navigation to another one of the plurality of content views;

outputting, to the display device in response to a request via the user interface, a hierarchical representation of a sequence of the plurality of content views, the hierarchical representation comprising a plurality of visual representations corresponding to the plurality of content views, the sequence including at least a first revised content view at a first level of the hierarchical representation and a second revised content view at a second level of the hierarchical representation, the second revised content view including revisions from the first revised content view and new revisions;

outputting, to the display device, the first revised content view in response to a selection from the hierarchical representation via the user interface of one of the plurality of visual representations corresponding to the first revised content view; and deleting the first revised content view such the revisions from the first revised content are deleted while the new revisions in the second revised content view are retained to create a final revised content view in the hierarchical representation, which is then outputted to the display device.

15. The method of claim 14, further comprising outputting, to the display device, additional information corresponding to at least one of the plurality of content views in response to receiving a two finger spread movement via a touch screen.

16. The method of claim 14, further comprising outputting, to the display device, an indicator of a level in the hierarchical representation in response to the selection from the hierarchical representation via the user interface of one of the visual representations corresponding to the first revised content view.

17. The computer program product of claim 11, wherein each of the plurality of content views comprises an electronic document.

18. The computer program product of claim 11, wherein the user interface comprises one of a touch screen and a mouse wheel.

19. The computer program product of claim 11, further comprising instructions to output, to the display device, a notice of a current revision to one of the plurality of content views that the display device is displaying.

20. The computer program product of claim 11, wherein each of the visual representations corresponding to the plurality of content views in the hierarchical representation comprises a corresponding identifier.

* * * * *